US012717725B1

(12) United States Patent
Sullivan

(10) Patent No.: US 12,717,725 B1
(45) Date of Patent: *Aug. 25, 2026

(54) SYSTEMS AND METHODS FOR COUPLED CACHE MANAGEMENT

(71) Applicant: Appian Corporation, McLean, VA (US)

(72) Inventor: Brian Sullivan, McLean, VA (US)

(73) Assignee: Appian Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,060

(22) Filed: Nov. 4, 2024

Related U.S. Application Data

(63) Continuation of application No. 18/483,384, filed on Oct. 9, 2023, now Pat. No. 12,164,434, which is a continuation of application No. 18/051,279, filed on Oct. 31, 2022, now Pat. No. 11,822,485, which is a continuation of application No. 17/111,418, filed on Dec. 3, 2020, now Pat. No. 11,513,968.

(51) Int. Cl.

| | |
|---|---|
| ***G06F 12/0895*** | (2016.01) |
| ***G06F 12/0804*** | (2016.01) |
| ***G06F 12/0813*** | (2016.01) |
| ***G06F 12/084*** | (2016.01) |

(52) U.S. Cl.
CPC ...... *G06F 12/0895* (2013.01); *G06F 12/0804* (2013.01); *G06F 12/0813* (2013.01); *G06F 12/084* (2013.01)

(58) Field of Classification Search
CPC ............. G06F 12/0804; G06F 12/0813; G06F 12/084; G06F 12/0895
See application file for complete search history.

(56) References Cited

U.S. PATENT DOCUMENTS

| | | | | |
|---|---|---|---|---|
| 5,864,854 | A | 1/1999 | Boyle | |
| 10,496,315 | B1 | 12/2019 | Niu et al. | |
| 11,893,653 | B2 * | 2/2024 | Rao | G06F 12/109 |
| 2013/0176338 | A1 | 7/2013 | Park et al. | |
| 2015/0187043 | A1 | 7/2015 | Shebanow et al. | |
| 2016/0004455 | A1 * | 1/2016 | Iwasa | G06F 3/0689 711/112 |
| 2016/0188251 | A1 * | 6/2016 | Dunning | G06F 12/109 711/165 |
| 2021/0124754 | A1 | 4/2021 | Yang et al. | |

* cited by examiner

*Primary Examiner* — Aracelis Ruiz
(74) *Attorney, Agent, or Firm* — FINNEGAN, HENDERSON, FARABOW, GARRETT & DUNNER L.L.P.

(57) ABSTRACT

Methods, systems, and computer-readable storage media for maintaining and utilizing a unified cache memory. The method first identifies a unified cache memory associated with an application and populates it with data for access during application execution. The unified cache memory is associated with coupled lookup elements, which include multiple keys and multiple values coupled together. The coupled lookup elements are available to the application for access to all possible views of the data.

20 Claims, 10 Drawing Sheets

100

410

| GPS Coordinates (411) | Street Address (412) | Airport Code (413) | Fahrenheit (414) | Celsius (415) |
|---|---|---|---|---|
| 37.6189995; -122.375 | San Francisco Airport | SFO | 65 | 18 |
| 40.639801; -73.7789002 | John F. Kennedy Airport | JFK | 90 | 32 |
| 29.9843998; -95.3414001 | George Bush Airport | IAH | 110 | 43 |
| 45.5886993; -122.5979996 | Portland Airport | PDX | 58 | 14 |
| 47.4490013; -122.3089981 | Seattle Tacoma Airport | SEA | 60 | 15 |
| 41.9785996; -87.9048004 | O'Hare Airport | ORD | 95 | 35 |
| 33.6366997; -84.4281006 | Hartsfield-Jackson Airport | ATL | 94 | 34 |
| 29.9934006; -90.2580032 | Louis Armstrong Airport | MSY | 98 | 37 |
| 39.8616982; -104.6729965 | Denver Airport | DEN | 62 | 17 |

450

| UUID (451) | SSN (452) | First Name (453) | Last Name (454) | Salary (455) | Favorite Team (456) |
|---|---|---|---|---|---|
| f2856c06-9f19-41e4-8351-e4b6f3133c1f | 527-61-2874 | Susie | Munoz | 20,000 | LA Lakers |
| 38cd0486-d2b9-49f3-b54a-6e64cb2d9765 | 387-21-2096 | Roy | Adkins | 15,000 | Miami Heat |
| c2dfac76-c586-4590-b1fa-d1b6847fddd2 | 525-68-2781 | Ricky | Harper | 14,500 | Houston Astros |
| ef31bc60-4c88-492f-a546-7bb07f35522d | 531-40-1399 | Lora | Rogers | 34,000 | Oakland As |
| 18cedf34-7737-4913-8217-44a9dc102799 | 319-60-8209 | Joel | Gutierrez | 96,000 | NE Patriots |
| 4436a6e0-cbe0-4b41-9b74-e2741e51a6a0 | 505-45-9779 | Elisa | Myers | 18,000 | NY Giants |
| 7164f25b-822c-4515-9896-b48840726061 | 520-48-8507 | Annette | Doyle | 54,000 | San Jose Sharks |
| 98f427f7-6dc1-486a-84a0-1500a1a67ca8 | 486-88-4602 | Hannah | Caldwell | 76,000 | Clemson Tigers |
| 0b7becd4-6694-4aed-9837-cc4c0264b152 | 136-50-2513 | Marcos | Frazier | 47,000 | Seattle Sounders FC |

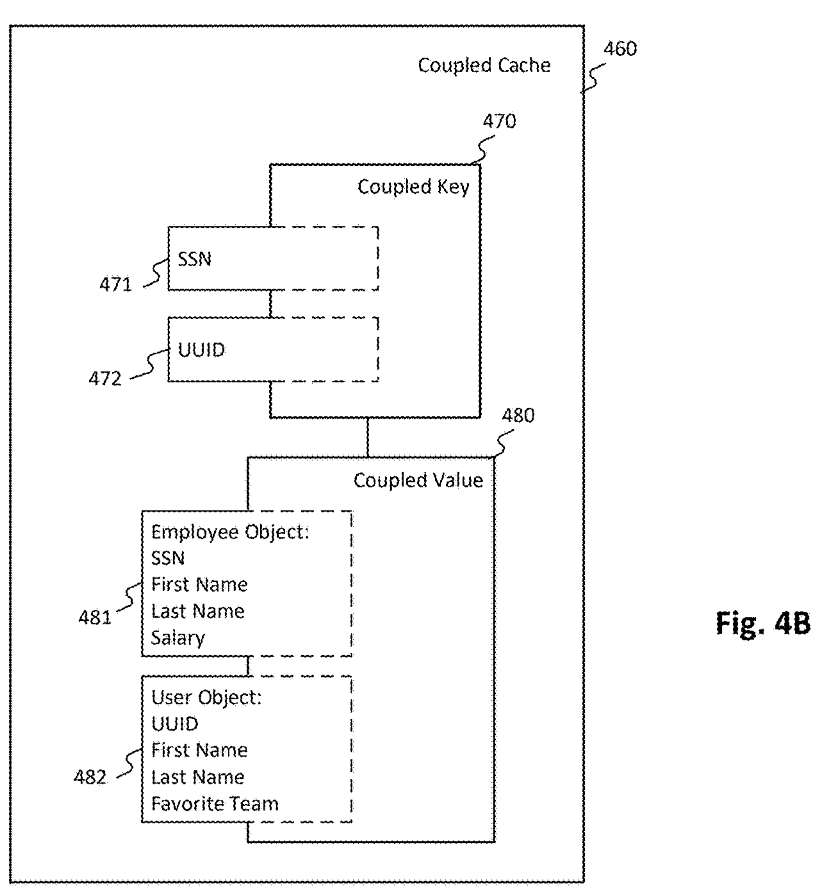

Fig. 4B

Post Delete: Value 2c
(Incompatible Operation)

SYSTEMS AND METHODS FOR COUPLED CACHE MANAGEMENT

CROSS REFERENCE TO RELATED APPLICATIONS

This application is a continuation of U.S. Non-Provisional patent application Ser. No. 18/483,384, filed on Oct. 9, 2023 (Now U.S. Pat. No. 12,164,434), which is a continuation of U.S. Non-Provisional patent application Ser. No. 18/051,279, filed on Oct. 31, 2022 (Now U.S. Pat. No. 11,822,485), which is a continuation of U.S. Non-Provisional patent application Ser. No. 17/111,418, filed on Dec. 3, 2020 (Now U.S. Pat. No. 11,513,968), all of which are incorporated herein by reference in their entirety.

TECHNICAL FIELD

This disclosure relates to the management of a coupled cache memory. More specifically, this disclosure relates to systems and methods for coupling multiple keys and multiple associated values in a cache memory in order to enhance the speed and flexibility of the cache memory when being used in connection with an application.

BACKGROUND

Retrieving data from a secondary storage, such as a hard disk or database, can be slow and inefficient. For modern software applications, frequent access to the same area of secondary storage may result in unnecessary latency in the application's performance. Consequently, developers sometimes designate a storage space within a faster access memory, such as random-access memory (RAM) for quicker access to data repeatedly utilized by a software application. Such a configuration helps avoid the slow process of retrieving data from persistent storage for at least certain data frequently used by the application. The process of mirroring the contents of secondary storage into primary storage, such as a faster memory (e.g., RAM), for data retrieval is called caching, and the mirrored primary storage space is referred to as cache memory, or "cache." The cache is usually configured with keys for purposes of lookup and access to the data stored in the cache memory. Several commercial and open source software providers, such as Memcached™ and Redis™, provide caches that store data in a key-value pair format in the memory.

The timeline for management of keys and values in the cache memory may be set by the developer of the software application using the cache. Some cache management software may have certain policies to help manage the key-value pairs. The software may evict either the key's value or the key and its value from time to time based on policies such as the frequency of usage of the values and last used timestamp of a key-value pair, i.e., the "eviction policy." Some of the eviction policies for purging key-value pairs in the cache memory may include least-frequently used values and least-recently used values.

The cache memory may be configured at either the time of developing a software application ("development time") or the time of running a software application ("runtime"). In both scenarios, the developer determines which data on the secondary storage, such as a hard disk or a database, may be stored in the cache memory.

As multiple developers build a software application over a period of time, and the requirements and functionality for that application change, the uses and needs for cached values also often change in the process. As a result, different developers may write software code that creates caches that are partially or wholly redundant to previously configured caches. This results in wasted space in the cache memory, whose size is typically limited, and wasted access and updates to the multiplicity of configured caches, when accessing or updating such partially or wholly redundant data. Existing technologies, such as write-through, write-back and write-behind caches, are useful for synchronizing data in the cache with data in the secondary storage. However, these technologies only update a single cache, and are not useful for ensuring data in multiple configured caches that mirror the same data in the secondary storage are all identical, as required. When a configured cache does not contain the most updated data, it becomes "stale" (no longer the same as the value in the primary data storage's value which is being mirrored in the cache), and the most recent data must be retrieved from the secondary storage to refresh the stale data with the correct data. Such retrieval introduces unnecessary inefficiencies in application speed. Further, when stale data is accessed and used, it may result in incorrect output by the application.

When a multiplicity of overlapping caches are used, program developers need to keep track of all instances of each piece of data in each overlapping cache that needs to be updated. The complexity of updating each such cache increases exponentially with the number of instances of overlapping caches that hold the relevant instances of data that need to be updated. This creates the possibility that data in every such cache is not updated due to developers' oversights. When such oversights occur, values in such overlapping caches may become stale.

Accordingly, as described above, there are several technological deficiencies in the art that give rise to a need for improved cache management techniques. There are technological needs for techniques that can couple multiple views of the same data and the keys associated with the different views of the data. Such cache management techniques should advantageously manage the multiple views of the data, avoid the problems of stale data in the cache, and also maximize usage of the cache even in regards to code in which the developer has not set rules to access data from the cache memory storage.

SUMMARY

Certain embodiments of the present disclosure relate to a non-transitory computer readable medium, including instructions that when executed by at least one processor cause the at least one processor to perform operations for maintaining and utilizing a unified cache memory. The operations may include identifying a unified cache memory associated with an application; populating the unified cache memory with data to be accessible to the application during execution of the application; associating a plurality of coupled lookup elements with the unified cache memory, the plurality of coupled lookup elements including at least one of: coupled keys, comprising two or more keys for identifying data within the unified cache memory coupled together with and pointing to data, or coupled data, comprising two or more elements of data in the unified cache memory coupled together and being pointed to by keys; and making available, to the application, the plurality of coupled lookup elements for utilizing the unified cache memory.

According to some disclosed embodiments, the populating includes obtaining one or more data sets to be retrieved during execution of the application.

According to some disclosed embodiments, the populating includes retrieving the data from a slower location such as: a local disk storage, a remote disk storage, a RAM storage on a remote computing device, or any other type of storage from which retrieval is slower than retrieval from the unified cache memory.

According to some disclosed embodiments, the identifying includes provisioning the unified cache memory as part of development of the application.

According to some disclosed embodiments, a first key from the coupled keys is a composite key composed of a plurality of constituent key pieces.

According to some disclosed embodiments, the operations further comprise identifying an update to the data in the unified cache memory.

According to some disclosed embodiments, the operations further comprise determining whether the update to the data is compatible with the plurality of coupled lookup elements.

According to some disclosed embodiments, the operations further comprise, upon determining that the update to the data is compatible, determining not to eliminate, i.e., remove, from the unified cache memory any of the plurality of coupled lookup elements.

According to some disclosed embodiments, the operations further comprise, upon determining that the update to the data is not compatible, eliminating one or more of the plurality of coupled lookup elements.

According to some disclosed embodiments, the operations further comprise making a single call to an external storage using at least one of the coupled keys and, in response to the call, receiving the entirety of the coupled data.

Certain embodiments of the present disclosure relate to a computer-implemented method for maintaining and utilizing a unified cache memory. The method may include identifying a unified cache memory associated with an application; populating the unified cache memory with data to be accessible to the application during execution of the application; associating a plurality of coupled lookup elements with the unified cache memory, the plurality of coupled lookup elements including at least one of: coupled keys, comprising two or more keys for identifying data within the unified cache memory coupled together with and pointing to data, or coupled data, comprising two or more elements of data in the unified cache memory coupled together and being pointed to by keys; and making available, to the application, the plurality of coupled lookup elements for utilizing the unified cache memory.

According to some disclosed embodiments, the coupled keys each represent one of a plurality of views of the coupled data.

According to some disclosed embodiments, the method further comprises determining whether the update to the data is compatible with the plurality of coupled lookup elements.

According to some disclosed embodiments, the method further comprises, upon determining that the update to the data is compatible, determining not to eliminate any of the coupled keys.

According to some disclosed embodiments, the method further comprises, upon determining that the update to the data is not compatible, eliminating one or more of the coupled keys.

According to some disclosed embodiments, the eliminating includes eliminating one or more of the coupled keys corresponding to a view of the coupled data determined to be incompatible with the update to the data.

According to some disclosed embodiments, the populating includes obtaining one or more data sets to be retrieved during execution of the application.

According to some disclosed embodiments, the populating is performed during a runtime phase of the application.

According to some disclosed embodiments, the populating is performed during a software build phase of the application.

According to some disclosed embodiments, a first key from the coupled keys is a composite key composed of a plurality of constituent key pieces.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 4A-4B depict a mapping between an exemplary coupled cache and database tables, according to some embodiments of the present disclosure.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms, thus, cover both active forms, and passive forms, of sending and receiving.

Systems and methods consistent with the present disclosure are directed to maintaining and utilizing a unified cache memory. In some embodiments, the unified cache memory may include options for the management of multiple views of the same data using coupled values and associated coupled keys. As described below, these techniques of cache management result in technological improvements in the speed of applications, reducing instances of stale data in the cache, and efficiently utilizing data in the cache.

Figure 1:
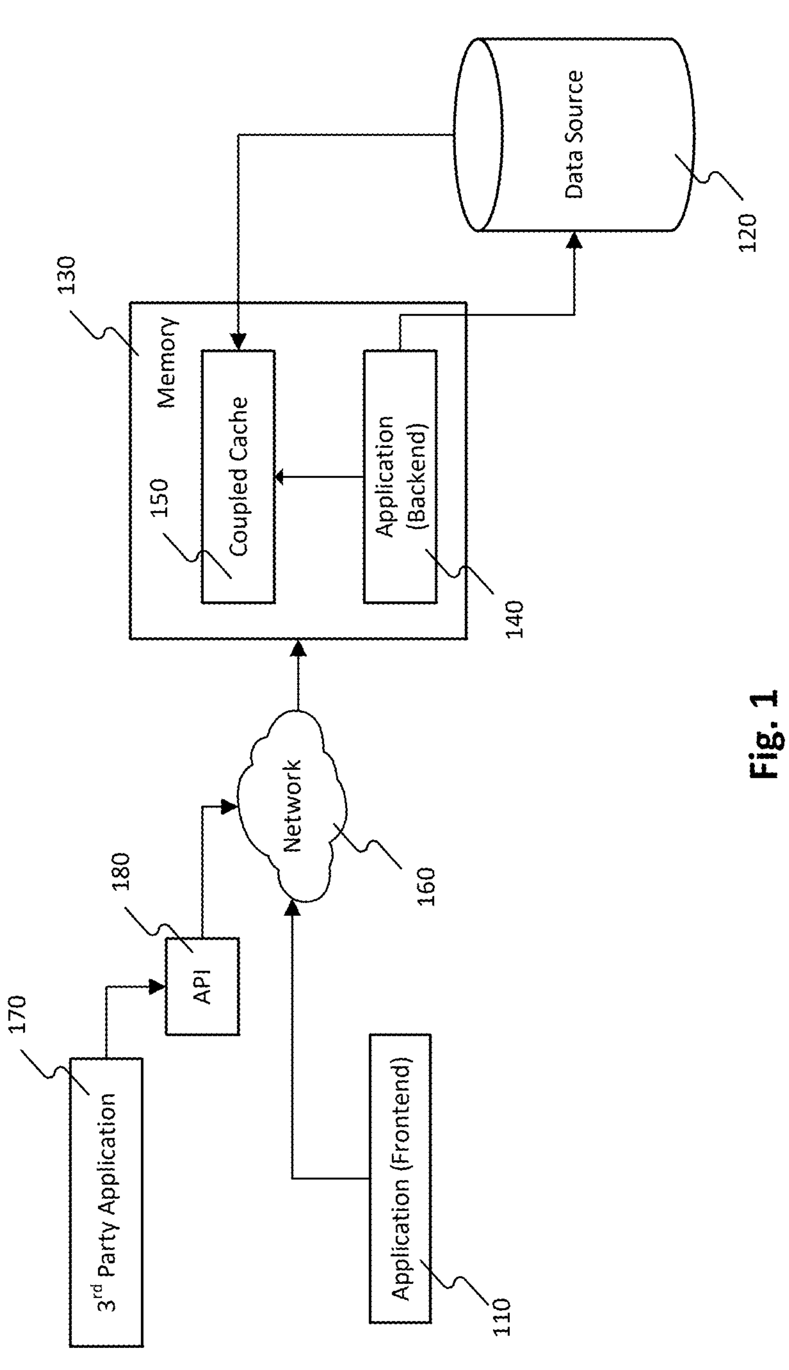
FIG. 1 is a block diagram showing various exemplary components of a system for maintaining and accessing a coupled cache, according to some embodiments of the present disclosure.

FIG. 1 is a block diagram showing various exemplary components of a system 100 for maintaining and accessing a coupled cache 150, according to some embodiments of the present disclosure. The system 100 comprises a data source, such as persistent storage data source 120 containing data related to one or more applications running in the system 100. In various embodiments, the data source 120 may take several different forms. For example, data source 120 may be an SQL database or NoSQL database, such as those developed by MICROSOFT, REDIS, ORACLE, CASSANDRA, MYSQL, various other types of databases, data returned by calling a web service, data returned by calling a computational function, sensor data, IoT devices, or any other data source that is slower to access than cache memory. Data source 120 may store data that is used in the operation of applications, such as application 110. For example, if application 110 is configured to provide statistics regarding a professional sport, data source 120 may store historical data relating to past games, athletes, and teams. Similarly, if application 110 is configured to provide human resources functionality within an organization, data source 120 may store data relating to employees, benefits information, salary information, evaluation data, and similar data. In some embodiments, data source 120 may be fed data from an external source or be replaced by the external source (e.g., server, database, sensors, IoT devices, etc.).

As illustrated in FIG. 1, data source 120 may communicate with temporary storage memory 130, which may comprise application backend 140 and coupled cache 150. Temporary storage memory 130 may be implemented in several ways. For example, in various embodiments temporary storage memory 130 may be implemented in Dynamic RAM (DRAM), Static RAM (SRAM), Advanced-RAM (A-RAM), Synchronous Dynamic RAM (SDRAM), Double Data Rate SDRAM (DDR SDRAM), Graphics DDR SDRAM (GDDR SDRAM), Flash, or other types of temporary memory. As described further below, certain data from data source 120 may be stored in coupled cache 150 of temporary storage memory 130 for quick and/or repetitive access by application 110.

The application backend 140 includes the backend functionality of an application 110 copied to temporary memory 130 for execution. Application 110 can be a graphical user interface, command line interface, or an application with no interface. Certain data accessed by the application backend 140 may be copied to the cache memory 150 from the data source 120 for quick access to the data in future requests. The application backend 140 may access data by communicating with the data source 120 and/or coupled cache 150. Depending on the design of the application backend 140, certain frequently accessed data may be stored in cache memory 150, while less frequently accessed data may be stored in data source 120.

The requests to access the data in the data source 120 and the coupled cache 150 may optionally be received via a network 160. Network 160 may take various forms. For example, network 160 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or various other types of network communications. In some embodiments, network 160 may include an on-premises (e.g., LAN) network, while in other embodiments network 160 may include a virtualized network, e.g., AWS, AZURE, IBM CLOUD, etc. Further, network 160 may in some embodiments be a hybrid on-premises and virtualized network.

As illustrated in FIG. 1, system 100 may also include a frontend of an application 110 and a third-party application 170. Both application frontend 110 and third-party application 170 may make requests for data in coupled cache 150 and data source 120. The system 100 may also include an application programming interface (API) 180, which may define rules for communication with the application backend 140 and access to the data in data source 120 and coupled cache 150. Accordingly, API 180 may be a public API or a private API. API 180 may be based on the Simple Object Access Protocol (SOAP), XML-RPC, JSON-RPC, Representational Stage Transfer (REST), object linking, or other protocols.

The application frontend 110 may make a request to access data stored in the data source 120 and/or coupled cache 150, said request optionally occurring over network 160, to present on the application frontend 110. Some of the data in the data source 120 may be repeatedly requested by the application frontend 110 and may be stored in the memory 130 (e.g., in coupled cache 150) for faster access to the requested data. The application frontend 110 may interact with the application backend 140 in order to access the data source 120. In some embodiments, the application backend 140 may directly request access to the data temporarily stored in the memory 130 (e.g., coupled cache 150).

The storage of data from the data source 120 in the memory 130 forms a cache which allows for quick access to the data. The cached data is stored in coupled cache 150. Upon a request to access certain parts of a set of data, the application backend 140 may verify whether the coupled cache 150 includes a value matching a certain part of the data. The verification may be done by using the lookup key to identify the value. The lookup key may be the primary key of a table in the data source 120, which includes the requested data in a row in the table of the data source 120, or an identifying, non-empty set of columns of the row in a table in the data source 120. In a regular cache generated in the memory 130, every access to data may result in a new key-value pair in the cache. A detailed description of the coupled cache 150, as described herein, is provided in connection with FIG. 2 below.

Figure 2:
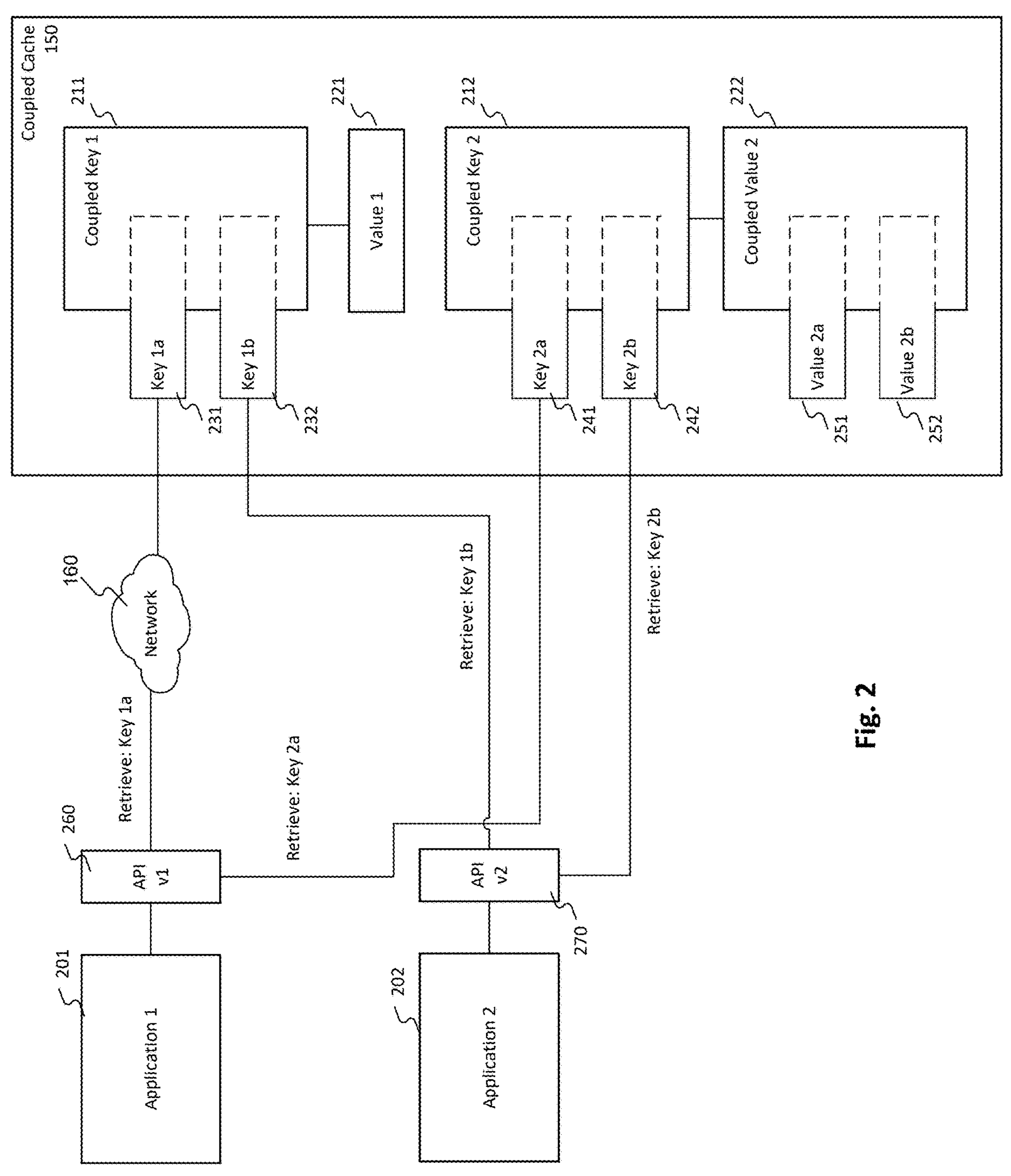
FIG. 2 illustrates an exemplary embodiment of different request paths to access the same values in a coupled cache, according to some embodiments of the present disclosure.

FIG. 2 illustrates an exemplary embodiment of different request paths to access the same values in a coupled cache 150, according to some embodiments of the present disclosure. As shown in FIG. 2, application 201 and application 202 communicate with the coupled cache 150 to access data to be presented in the applications. The coupled cache 150 may include a coupled key 211 mapped to a value 221 and coupled key 212 mapped to a coupled value 222. The coupled key 211 may include at least two keys, such as keys 231 and 232, and the coupled key 212 may include at least two keys, such as keys 241 and 242. It should be noted that this arrangement and use of coupled keys 211-212 and coupled value 222, as disclosed herein and further discussed below, is in contrast to existing techniques, which involve only a single key mapped to a value, and do not offer the efficiency and scalability benefits achieved by the present disclosure.

The value 221 may be accessed using either the key 231 or 232 or both. In some embodiments, the keys 231 and 232 may be different data types. For example, the keys 231 and 232 may be of integer and string data types, respectively. The keys 231 and 232 may further include the same content in different formats. In some embodiments, the keys 231 and 232 may be of the same data type but include different content. The multiple keys may represent different versions of the key-value pair. For example, the keys 231 and 232 may be two different versions of an object-oriented class with different class members. In such an embodiment, applications 201 and 202 may access the same value 221 using different classes, i.e., the keys 231 and 232. In the coupled cache 150, the keys 231 and 232 are not forced to maintain two different caches but rather are coupled together to form a coupled key 211. Such a setup can help make sure that any update to value 221 is easily visible to both applications 201 and 202.

The different keys used to access the same value 221 may be a limitation of different request paths to access the values stored in the coupled cache 150. The request paths may have different origins and may need different data type keys to access the value 221. For example, applications 201 and 202 may be developed using different programming languages and may have different data types available to make a request to access the value 221. In some embodiments, the intermediate components of the request path may result in different versions of the keys to be present in the coupled key 211. As shown in FIG. 2, for example, applications 201 and 202 may utilize different versions of application programming interfaces (APIs) 260 and 270 to communicate with coupled cache 150. These different versions of the API 260 and 270 may submit different keys (e.g., the key 231 or the key 232) to interact with the coupled cache 150.

Applications 201 and 202 may also access different values using different keys. As shown in FIG. 2, for example, applications 201 and 202 may access cached values 251 and 252 in coupled value 222 using different keys 241 and 242 in coupled key 212. Different values associated with different keys may be coupled together in a coupled value if the different values are related to each other. The different values may be considered related, for example, if they are alternative names or identifiers for the same value, are different versions of the same value, belong to the same object (e.g., same person, company, computing resource, etc.), and/or are different portions of the same value. The keys 241 and 242 in coupled key 212 may be related directly or indirectly. Keys may be indirectly related because the data they point to are associated in some way, for instance a person's name and address could be indirect keys used to access that person. In addition, the keys 241 and 242 may be coupled due to the relationship between the associated cached values 251 and 252. A detailed discussion of related values in a coupled value is presented using exemplary embodiments in FIGS. 4A-4B.

Figure 3:
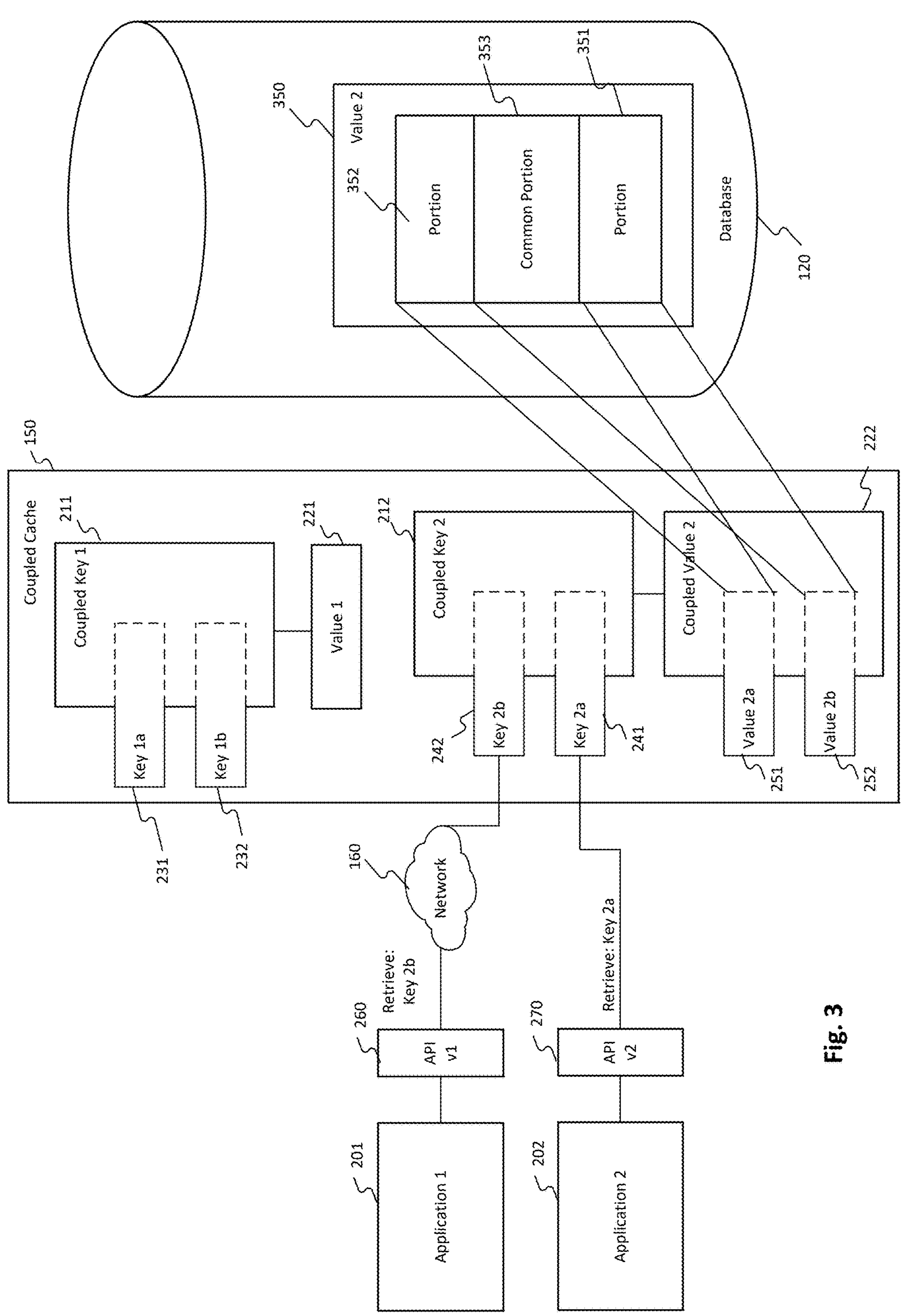
FIG. 3 illustrates an exemplary embodiment of a coupled cache providing access to different views of the same value, according to some embodiments of the present disclosure.

FIG. 3 illustrates an exemplary embodiment of a coupled cache 150 providing access to different views of the same value 222, according to some embodiments of the present disclosure. As shown in FIG. 3, the coupled value 222 may act as different views of the same data in the data source 120. The different views of data in the data source 120 are presented as different values 251 and 252 in the coupled value 222. The different views may be different portions of a value 350 stored in the data source 120 and accessed by the applications 201 and 202. The system 100, as described in connection with FIG. 1, may keep track of different portions of the data and create a single coupled key-value pair to access all or some portions of the value 350. The cached values 251 and 252 within the coupled value 222 may include overlapping portions of the value 350. Various portions of the same value may be accessed using any of the keys associated with that value. Thus, for example, the various portions of the same value 350 in the coupled value 222 may be accessed using either of keys 241 and 242 in a coupled key 212.

In some embodiments, access to a certain portion of the value 350 may be dependent on the origin of the request (e.g., request from the application 201 or 202). For example, application 201 may only be able to access a portion 351 of the value 350 along with a common portion 353 of value 350. The application 201 may be restricted from accessing portion 352 of value 350 along with a common portion 353 of value 350, for instance because it may use an older ("v1") version of API 260 to communicate with the coupled cache 150 only the portion 352 of value 350 compatible with the older version of the API 260 may be accessible. In some embodiments, the restriction may be due to access via the public network 160. The public network 160 may be regarded as an insecure communication channel and restrict access to the portion 351 of the value 350.

Application 202 may have access to the portion 351 and common portion 353 of the value 350 stored in the cached value 251. The application 202 may access the portion 352 due to direct access to the coupled cache 150 and/or usage of a newer ("v2") version of API 270. In some situations, there may optionally be an authentication requirement before application 202 may access portion 352. Portions 351 and 352 may include the same content represented by different data types to maintain compatibility with two different versions of API (e.g., the API 260 and 270). Neither Application 201 nor Application 202 may be able to access all portions of the value 350. In some embodiments, an additional portion of value 350 may exist, which is not part of either portions 351 or 352 and not accessible by either Applications 201 or 202.

The keys 241 and 242 in the coupled key 212 may have a one-to-one relationship with cached values 251 and 252 in the coupled value 222. Application 201 may access the cached value 252 by sending the key 242 to the coupled cache 150. The coupled cache looks up the key 242 in the coupled keys 211 and 212 to access the associated cache value 252. The coupled cache 150 may maintain an account of the individual relationships between the keys and values in the coupled keys 211-212 and the coupled values 221-222. The individual relationships between the keys and values may be stored separately in coupled cache 150. In some embodiments, the relationships between individual keys and values may be stored outside the coupled cache 150, for instance, in data source 120.

In some embodiments, the coupled cache 150 may further review the access patterns to values (e.g., the value 350) stored in the data source 120 to determine the coupled keys and coupled values. For example, historical records or logs of access patterns may be stored in data source 120 (or a separate database). The coupled cache 150 may bind together cached values accessing the same or overlapping data and the keys associated with the cached values. In some embodiments, a single key may be associated with one or more values in the coupled value 222. Different values may be accessed based on the application making the request (e.g., application 201 or 202), API used to make the access (e.g., API 260 or 270), and other details of the data access origin request (e.g., IP address, MAC address, application identifier, identity identifier, timestamp, requested action, etc.).

In some embodiments, the different views of the data may include exactly the same data presented in different manners. For example, the value 350 may be presented as instances of two different classes. The class data types may be used as the keys to access the different views of the data. Upon receiving the request, the coupled cache 150 may present a view of the value 350 by populating the member values of the class type presented as a key in the coupled key 212. The populated object of a class type may be returned as a response to the request made by an application (e.g., application 201 or 202).

Figure 4A:
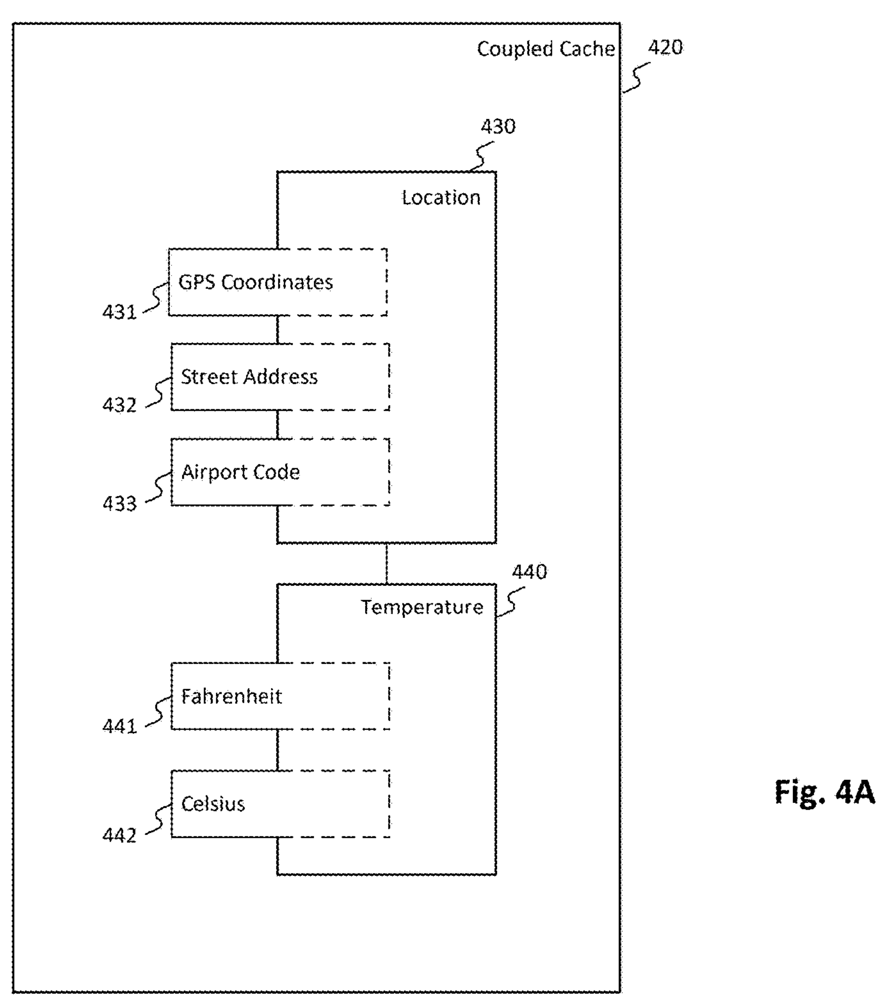

FIGS. 4A-4B depict a mapping between an exemplary coupled cache 420 and database tables, according to some embodiments of the present disclosure. As shown in FIG. 4A, a database table 410, is represented in a coupled cache 420 (similar to coupled cache 150, as discussed above) using one or more coupled key-value pairs. A coupled key-value pair may include all or a subset of columns of the database table 410. For example, columns 411-415 of the database table 410 may be present directly in the coupled key location 430 and the coupled value temperature 440, or may be transformed prior to storing in keys 431-433 and cached values 441-442. As an example, the columns 411-413 may be represented by the keys 431-433, and the columns 414-415 may be represented by the cached values 441-442. In some embodiments, the columns 411-415 may be present in both the coupled keys and the coupled values, for instance when the whole of a single row of data is returned from the database.

The coupled value temperature 440, in this example implementation, includes different views of the same data (temperature of a location). In the current embodiment, the different views may be pre-computed and stored in the database table 410. In some embodiments, the database table 410 may only include the temperature in the Fahrenheit format in the column 414, and temperature in the Celsius format may only be stored in coupled value temperature 440 in cached value 442.

Coupled key location 430 may include different patterns of accessing data in the database table 410 through the coupled value temperature 440. Keys in a coupled key may also represent different views of the same data. The different patterns of access may include different keys provided as input to the coupled cache 420 to access the cached values 441 and/or 442. The coupled key location 430, in the illustrated example, may include airport location data represented by keys of GPS coordinates 431, street address 432, and airport code 433, among other potential keys. Each of the keys 431-433 in the coupled key location 430 are different ways to access the same temperature value, which, in this example, is the temperature at the location 430. In some embodiments, the keys may not be related and/or may not access exactly the same data in different representations.

In some embodiments, the API may allow for the specification of parameters that are used to select the appropriate value from among the coupled values. For example, in FIG. 4A the coupled cache 420 may provide the Fahrenheit temperature value 414 as an output when the parameter "F" is used in an API call, along with a particular airport code 413. If no such parameter is specified, the returned value(s) may include both the cached values Celsius 415 and Fahrenheit 414. In some embodiments, the coupled value is chosen based on external parameters which may filter one of the values.

FIG. 4B depicts a coupled cache 460 that is configured to access different portions of data in a database table 450 as different views of the data. In some embodiments, the different portions of the data may include overlapping data. As shown in FIG. 4B, database table 450 may be represented by coupled key-value pairs in coupled cache 460. Columns 451-456 may be presented in a coupled cache 460 directly or after transforming them by grouping together certain columns.

The coupled cache 460 may include a coupled value 480 storing two different views of database table 450 in two different cached values: employee object 481 and user object 482. The cached value employee object 481 may represent the employment details portion of the database table 450, and the cached value user object 482 may represent the personal details portion of the database table 450. The cached values employee object 481 and user object 482 may share, for example, the same columns in database table 450 of first name 453 and last name 454. In some embodiments, the different views may include all the fields of the database table 450 but may only include a subset of the rows of the database table 450.

The coupled key 470 may include, in this example implementation, keys of social security number (SSN) 471 and universally unique identifier (UUID) 472, and may be used for accessing different views of the database table 450 in the coupled value 480. In some embodiments, the value accessed from the coupled value 480 may depend on the key in the coupled key 470. For example, the key SSN 471 may be mapped to access the cached value employee object 481, and the key UUID 472 may be mapped to access the cached value user object 482.

The columns 451-456 of the database table 450 may or may not be directly presented as part of one single coupled cache key-value pair. In some embodiments, the database table 450 contents may be stored in combination with other database tables in a single coupled cache key-value pair. For example, the columns salary 455 and favorite team 456 may be part of two other tables and may be associated with database table 450 by having columns SSN 452 and UUID 451 as foreign keys. In some embodiments, a coupled cache key-value pair may only include a portion of the data. For example, the coupled value 480 may only include a value of employee object 481 and may be accessed using either key 471 or 472, and a different coupled key-value pair may include the column favorite team 456 along with columns 453 and 454. The structure of the coupled cache key-value pairs may be defined at run time, in some embodiments, based on the access patterns of an application (e.g., the application 201) to access the data (e.g., the database table 450) in a database (e.g., the data source 120). In some embodiments, the columns in database table 450 may not map to any key or value in coupled key 470 and coupled value 480. For example, the favorite team column 456 may not be present in the either couple key 470 or couple value 480, as shown in FIG. 4B.

Figure 5A:
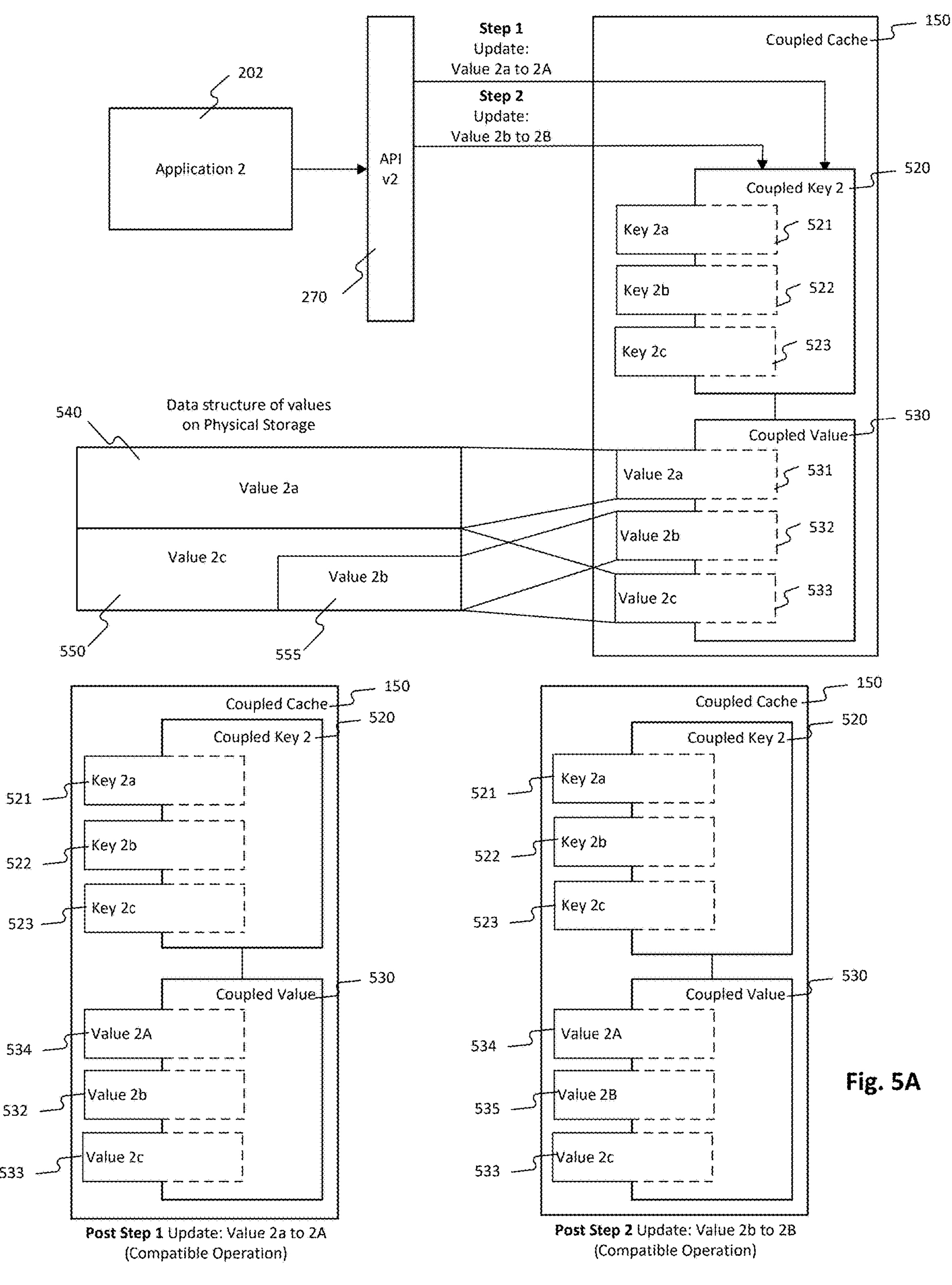
FIGS. 5A-5C illustrate multiple update operations on an exemplary coupled cache resulting in updates to coupled key and coupled value elements of the coupled cache, according to some embodiments of the present disclosure.
Figure 5B:
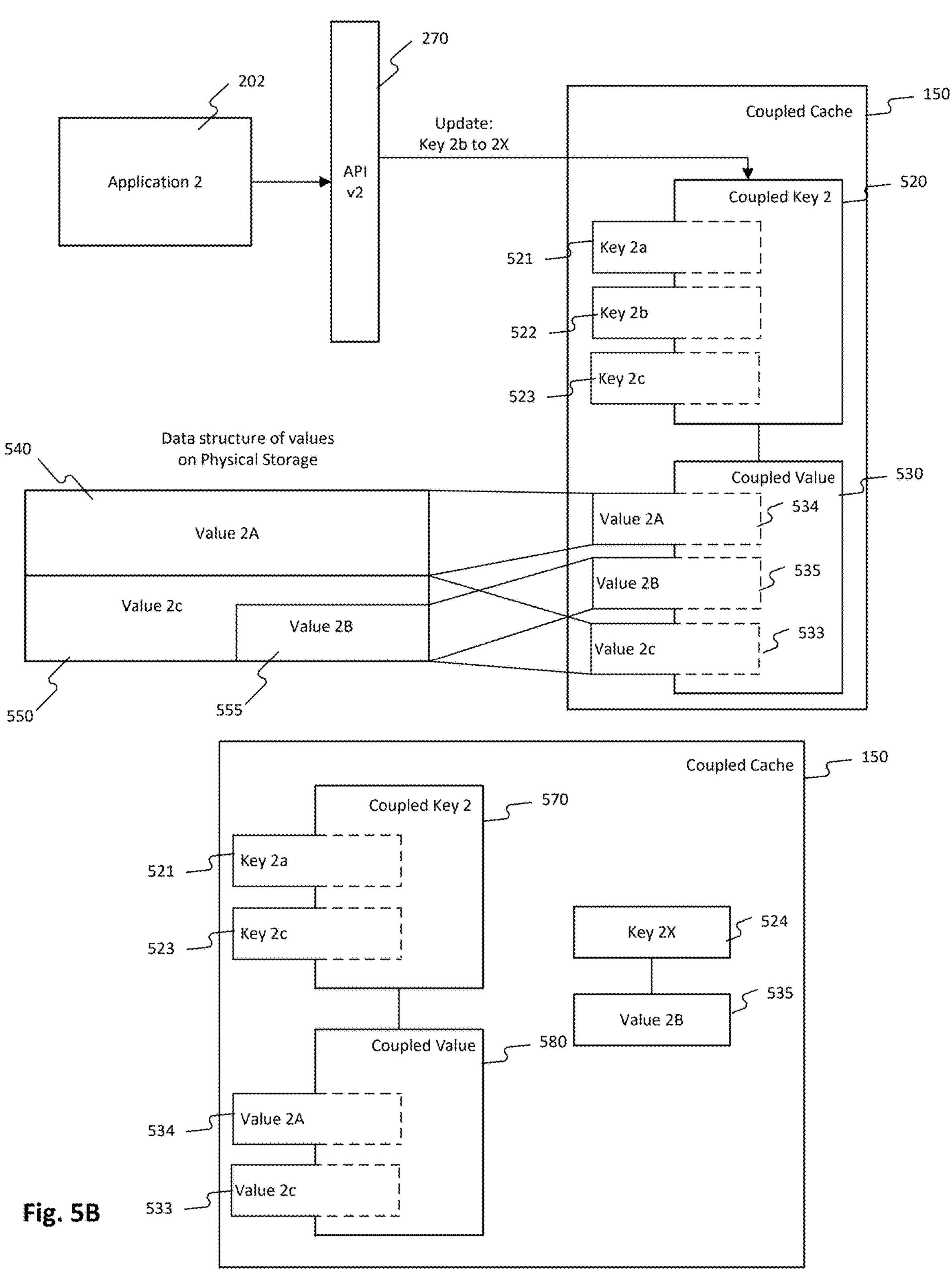
Figure 5C:
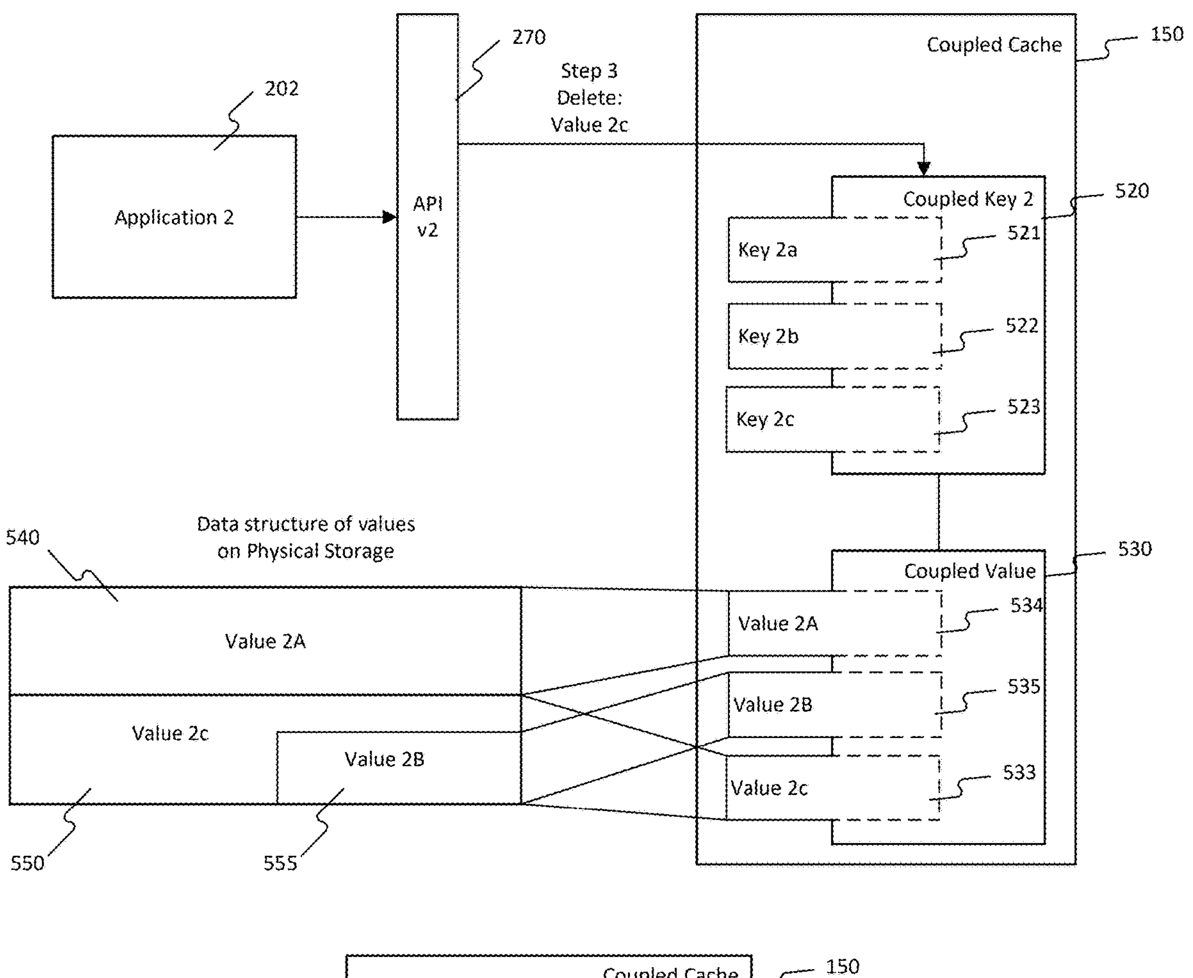
Figure 5C:
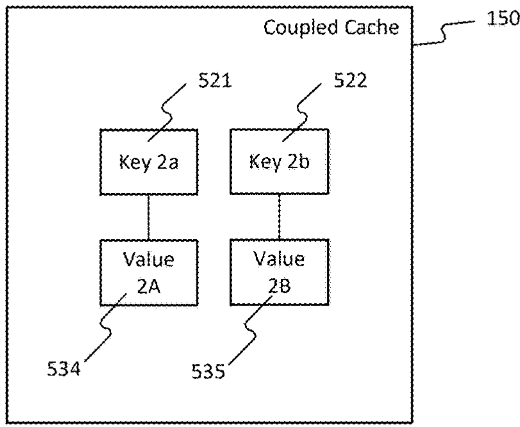

FIGS. 5A-5C illustrate multiple update operations on an exemplary coupled cache resulting in updates to coupled key and coupled value elements of the coupled cache 150, according to some embodiments of the present disclosure. The levels of effect on the coupled cache 150 entry upon updates to the value and key elements of the coupled cache 150 may vary between FIGS. 5A-5C.

In FIG. 5A coupled key 520 includes three keys 521-523 and is associated with a coupled value 530 with three cached values 531-533. In the exemplary embodiment, the values 540 and 550 may be related and result in associated cached values 531 and 533 to be part of a coupled value 530. Similarly, values 550 and 555 may also be related and result in associated cached value 532 being part of the coupled value 530. Application 202 may communicate with coupled cache 150 to access values 540, 550, and 555 through a "v2" version of API 270. In the exemplary embodiment, application 202 requests for two update operations to be performed (Step 1 "Update: Value 2a to 2A," Step 2 "Update: Value 2b to 2B").

In step 1, application 202 may request via API 270 to update value 540 from "2a" to "2A," and in turn, cached value 531 may also be updated. The update operation may provide a key 521 to access the cached value 531 and update its contents. In the exemplary embodiment, we assume that key 521 with identifier "2a" is provided. The cached value 531 may also be accessed using other keys 522 or 523 in coupled key 520. The status of the coupled cache 150 is shown below. The cached value 531 is replaced with cached value 534 pursuant to step 1's update operation whose contents are "2A." As value 540 does not depend on any of the other values, an update of its contents is a compatible operation and does not result in an update of the cache. A compatible operation, as discussed herein, is one that preserves the conceptual relationship between keys and values. For instance, adding a new key pointing to the same value (i.e., adding an alias), is always compatible. Adding a new value to the same key is also compatible (e.g., noting for the first time that an employee has a given shirt size). Changing the shirt size (updating the value) is compatible as it doesn't alter the key-value relationships. Changing the meaning of key "John Smith" from one employee (a 65-year old 5'10" person retiring) to another (a 21-year old 6'0" person just joining) is an incompatible change, as it fundamentally changes the meaning. The update of coupled value 530 to include cached value 534 requires the value 540 contents to have been updated from "2a" to "2A."

In step 2, application 202 may request via API 270 to update value 555 contents from "2b" to "2B," and in turn, cached value 533 may also be updated. In order to update the contents of value 555, the cached value 532 of coupled value 530 in coupled cache 150 shown after step 1 may be accessed and updated, resulting in an update of the value 555. Prior to updating the cached value 532, the coupled cache 150 may need to determine whether the operation is compatible with the current state of the coupled cache 150. The value 555 may be related to the value 550; for instance, it may be a subset of the value 550. So, a change to the value 555 will only need to change the cached value 532. Coupled cache 150 following step 2 is shown with the cached value replaced by cached value 535 whose contents are "2B." The contents of the values 540 and 555 may also be updated (not shown in FIG. 5A). The coupled cache 150 state shown following step 2 is used as the initial state of the coupled cache in FIGS. 5B and 5C.

FIG. 5B illustrates the effect on the coupled cache 150 upon update of the coupled key 521. The coupled cache 150 includes the coupled value 530 with the cached value 534 and 535 updated in steps 1 and 2, as described in FIG. 5A. Unlike the update operation presented in step 2, where the update to cached value 532 associated with key 522 did not result in an incompatible operation, an update to the key 522 may result in an incompatible operation. A new coupled key 570 and coupled value 580 may be created to include some of the previously related key-value pairs (e.g., the keys 521 and 523, the cached values 533 and 534). The incompatible key-value pair with an updated key 524 and the cached value 535 may be a separate key-value pair. The key-value pair with key 524 and cached value 535 may at a later time become part of coupled key 570 and coupled value 580 by establishing a relationship. The relationship may be established when interchangeable access to the cached value 533 containing value 555 and the cached value 535, which stores the contents of the value 555 is achieved. Interchangeable access, as described herein, occurs when a value retrieved for one key can be used for another value retrieval for another key. For example, the cache value 533 that contains the value 550 in the physical storage may be used by the system for providing a value for cache value 535 containing value 555 in physical storage. The cache value 533 may be use interchangeably for cache value 535 as one's content is a super set of the other. As described above, the value 555 is part of value 550, and this may result in using the value retrieved using key 524, which may satisfy the request using key 523. Interchangeable access may occur when one of the key-value pair includes the updated content. For example, any update of cache value 535 may not be immediately result in update of value 555 and cache value 533. In such a scenario requests to access cache value 533 may result in access to cache value 535 for the updated portion (value 555) of value 550. Similarly, any updates to cache value 533 not reflected in cache value 535 may result in access requests to cache value 535 redirected to request cache value 533, and thus use it interchangeably.

FIG. 5C illustrates the effect on the coupled cache 150 upon the deletion of the value 550. In the illustrated embodiment, the coupled cache 150 following step 2, as described in FIG. 5A, is used as the initial state of the coupled cache 150. As shown in FIG. 5C, the application 202 may make a call using API 270 to interact with coupled cache 150, which may translate to a delete operation. On receiving the delete option, the coupled cache 150 determines if the requested deletion operation is a compatible operation. The coupled cache may determine that the deletion of the value 550 is incompatible, and in turn, the cached value 533 would mean that the relationship between the values 550 and 555 is lost. When there is no relationship between two values, they cannot be part of a coupled value. Two values may be related, as discussed above, if they share a common field(s) between them. For example, as shown in FIG. 4B, value 481 ("Employee Object") and 482 ("User Object) share the fields "First Name" and "Last Name" causing a relationship to exist. In some embodiments, a relationship can exist when one value is part of another value. A value is part of another value if it shares all its fields with the other value it is part of. As shown in FIG. 5C, value 555 is part of value 550. Values 540 and 555 may not have any shared field and would not be deemed related. Two unrelated values may be part of the same common value, even if there is a value with a relationship to unrelated values. For example, value 550 may include fields common to value 540 and 555 and thus be related to both the values. Such a setup results in a coupled value 530 including unrelated values 540 and 555 along with value 550. In such a scenario, the deletion of value 550 may result in deletion of cache key-value pair 522, and 535 and split up of coupled value 530. As there may be no relationship between the values 540 and 555 other than through the value 550, their cached values may no longer be coupled. Thus, the operation is an incompatible operation, and the current coupled key 520 and the coupled value 530 need to be altered. As the values 540 and 555 have no relationship, two new key-value pairs of values 540 and 555 are created with the key 521 and 522 associated with the cached values 534 and 535.

Figure 6:
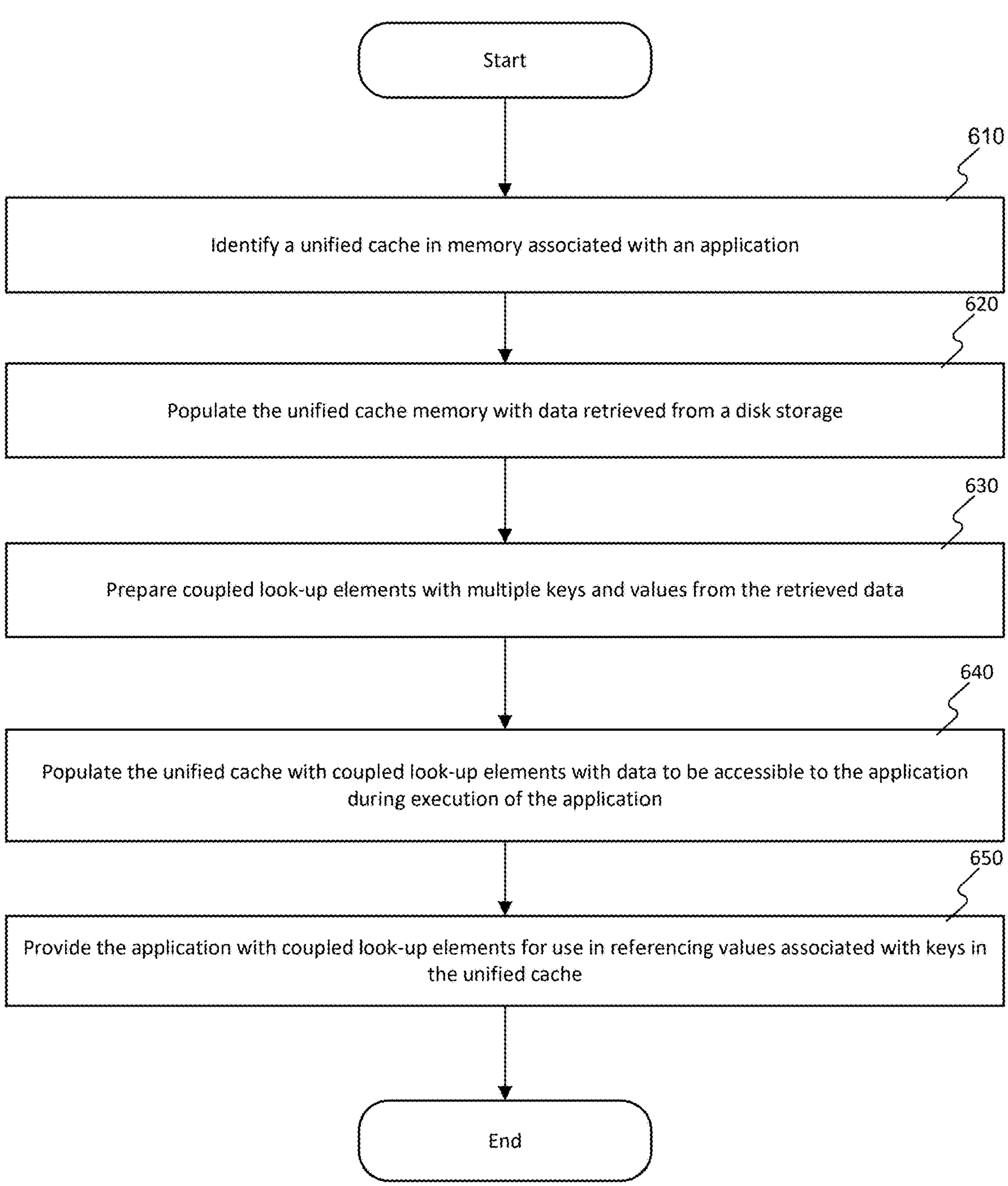
FIG. 6 is a flowchart depicting an exemplary setup of coupled cache memory, according to some embodiments of the present disclosure.

FIG. 6 is a flowchart depicting an exemplary coupled cache memory method 600, according to some embodiments of the present disclosure. The steps of method 600 may be performed by the system 100 for purposes of illustration. It will be appreciated that the illustrated method 600 can be altered to modify the order of steps and to include additional steps.

In step 610, the system 100 may identify a unified cache memory (e.g., the coupled cache 150) associated with an application. The identification process may involve confirming if the application (e.g., in relation to the application backend 140) expects a cache memory for quick access to the data in a secondary storage device (e.g., data source 120). In addition to confirming the requirement of cache memory, the system 100 may also need to provide a cache memory (e.g., the coupled cache 150) by requesting a computing device to allocate a part of the memory (e.g., the memory 130) and notifying an application (e.g., the application 201) of the presence of the cache memory.

In step 620, the system 100 may populate the unified cache memory (e.g., the coupled cache 150) with data to be accessible to the application (e.g., the application 201) during the execution of the application. The system 100 may populate the cache memory prior to executing the application. In some embodiments, the population of the cache memory may occur on the first access to data in a database (e.g., the data source 120). If certain data is not present in the cache memory, then the system 100 may first copy the data to the cache memory and then provide the result via the cache memory to the application (e.g., the application 201) requesting data. The application 201's future requests to access data source 120 may be redirected to the cache memory (e.g., the coupled cache 150) to expedite and efficiently handle the process of retrieving data. The populating of data in a unified cache memory may include retrieving the data from a slower location such as: a local disk storage, a remote disk storage, a RAM storage on a remote computing device, or any other type of storage from which retrieval is slower than retrieval from the unified cache memory.

In step 630, the system 100 may review the cache memory to determine if the newly requested data and the lookup key need to be part of a coupled lookup elements with other keys and their associated values. If so, the system 100 may associate the requested data with the other values and the key with the other keys in order to prepare coupled lookup elements. The determination may include checking if the data accessed from the secondary storage (e.g., the data source 120) relates to the values in the cache memory. Relationships between values may be present if they are different views of the same data. For example, the same data in a table may be represented using different data types by populating different class type instances or by casting data of one type to another type. Different views of the data may also exist when the same data is presented in different formats. For example, the temperature data may be presented in both Celsius and Fahrenheit format, as described above. In some embodiments, the values may be determined to be related if the values are part of a dataset. For example, the two values may be member values of a class. In some embodiments, the values may be determined to be related if various portions of a larger dataset are individually accessed. For example, the related values may be a subset of a dataset of values grouped together in a table.

In step 640, the system 100 may populate the cache memory with the coupled-lookup elements prepared in the previous steps (e.g., step 630). The populated coupled lookup elements in cache memory (e.g., cache memory 150) may be provided during the execution of the application (e.g., the application 201). The application during execution may request access to values populated in the coupled cache. The requested values may be accessed by coupled keys in the coupled cache.

In step 650, the system 100 may provide the populated cache memory (e.g., the coupled cache 150) with coupled lookup elements (e.g., the pairs of coupled keys 212) and coupled values (e.g., the pairs of coupled values 222) for future access to the data by an application.

Figure 7:
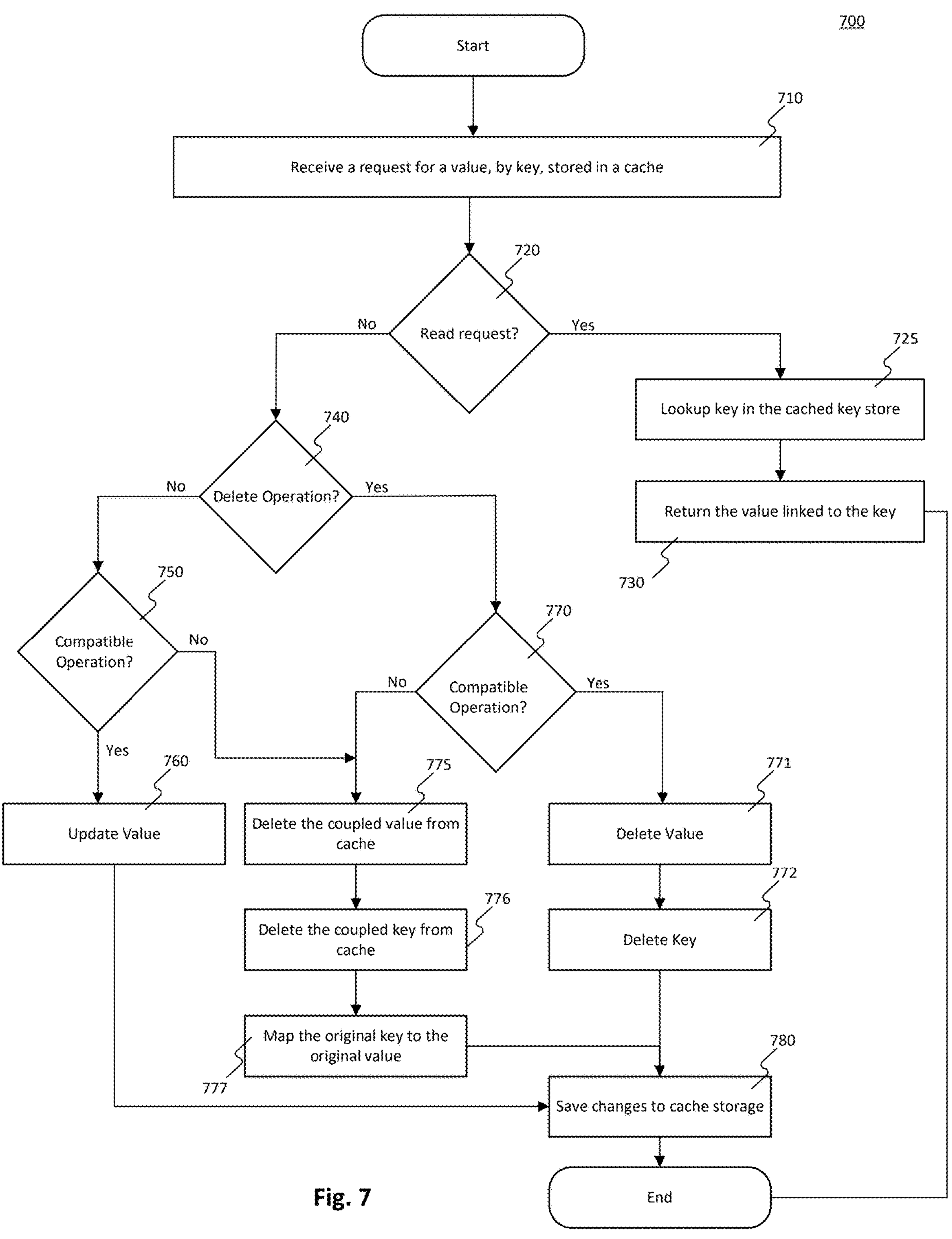
FIG. 7 is a flowchart depicting operations on values in the coupled cache, according to some embodiments of the present disclosure.

FIG. 7 is a flowchart depicting operations on values in a coupled cache, according to some embodiments of the present disclosure. The steps of method 700 may be performed by the coupled cache 150 for purposes of illustration. It will be appreciated that the illustrated method 700 can be altered to modify the order of steps and to include additional steps.

In step 710, the coupled cache 150 may receive a request for interacting with a value stored in the cache. The request may be from a local application or a remote application. The application may make the request to the coupled cache 150 directly, or the request may have been an API call (e.g., from API 260). The API request may, in turn, result in a call request to the coupled cache to access a value based on a key (e.g., the key 231 sent to coupled cache 150 in FIG. 2). The key corresponding to the requested value may not be present in the coupled cache 150 in some embodiments, and such operations may be directed to the coupled cache 150 after following the steps in method 600.

In step 720, the coupled cache 150 may determine if the requested operation is a read operation. If not, it is some form of update operation on the coupled cache 150. The update operation may involve, for example, updating the key or the value in the coupled cache 150. The update operation may also include adding new keys or values, deleting existing keys or values, or updating the contents of the key or value.

If the answer in step 720 is yes, i.e., the request is a read request, method 700 proceeds to step 725. The coupled cache 150 may look up the requested key in the set of coupled keys in operation 725. The key (e.g., key 231) may be part of the coupled key (e.g., coupled key 211) with other keys (e.g., key 232). Upon identification of the key in a coupled key in the coupled cache 150, the value (e.g., value 221) associated with the key may be retrieved from the coupled cache 150 as described in step 730.

In step 730, the coupled cache 150 may return the value linked to the key. In some embodiments, the value may be part of a coupled value (e.g., coupled value 222). The coupled value may include one or more values associated with a coupled key (e.g., coupled key 212) that contains the requested key (e.g., key 241). The returning of the value may include determining through a predetermined logic which of the values or all values in the coupled value to send a response to the received request in step 710. For example, as shown in FIG. 4B, the value “Employee Object” 481 or the value “User Object” 482 is returned based on which key is used to access the value (e.g., SSN or UUID).

If the answer in step 720 is no, i.e., the request is not a read request, method 700 proceeds to step 740. In step 740, the coupled cache 150 determines whether the operation is a delete operation. If the answer in step 740 is no, then the operation is an operation to update the content of the key or value in a coupled cache. The method 700 proceeds to step 750 to determine if the requested operation is a compatible operation or not. An operation may be considered compatible if either a coupled key is updated to one or more coupled keys or a coupled value is updated to one or more coupled values.

If the answer in step 750 is yes, the method proceeds to step 760. If the answer in step 750 is no, then the method 700 may proceed to step 775 to act on the incompatible operation by updating the coupled cache key-value pair. Updating the coupled cache key-value pair may include updating the relationship between the keys and values in the coupled cache key-value pair. The updated relationship may include deleting a coupled value and a coupled key. The updated relationship may also include a remapping relationship between the values and keys included in coupled values and keys, as discussed above.

If the answer is yes, then the method 700 may proceed to step 760 and update the contents of the key or value, if necessary, and then proceeds to step 780. The Update Value step may involve only updating the contents of the value in the coupled cache, or may also involve updating the contents of the database. To update the contents of a value in the coupled cache, the coupled cache may first need to identify the location of a value in the memory (e.g., the memory 130) based on the key sent along with the update request. The Update Value step may also result in sending an update request to the value (e.g., the value 550) stored in a database (e.g., the data source 120).

In step 770, the coupled cache 150 may determine whether the delete operation is a compatible operation. If the operation is not a compatible operation, then method 700 may proceed to step 775.

If the delete operation is a compatible operation, then method 700 may proceed to step 771. In step 771, the coupled cache 150 deletes the value. The deletion of a value may include delisting the value (e.g., the cached value 535) from a coupled value (e.g., the coupled value 530). Delisting of a value from a coupled value may include marking in the coupled cache that the value is no longer accessible. The marking may be indicated using a field such as a boolean field within the coupled cache. Delisting may also include removing any links from the coupled cache to the value in the memory. For example, any pointer to the memory location of the delisted value may be removed from the coupled cache. A delisting operation may result in immediate permanent removal of the value from the coupled value. In some embodiments, the delisting may result in marking to stop access to the value using the coupled key and having the value later removed permanently. The removal of links to the values as part of the delisting process may be conducted as a batch process. The batch process may permanently remove the links to the delisted values from the coupled value at regular intervals of time, or upon demand.

In step 772, the key may also be deleted. The deletion of a key may include delisting the key from a coupled key. If there are other values still associated with the key, then the key may continue to be included in the coupled key. The method 700 may then proceed to step 780.

As previously stated, if the delete operation is an incompatible operation, then method 700 may proceed to step 775. In step 775, the coupled value (e.g., the coupled value 530), which includes the value (e.g., the cached value 533) listed in the delete operation, may itself be deleted. If the operation was an incompatible update operation, the coupled value (e.g., coupled value 530 as shown in FIG. 5B), which may include a key-value pair (e.g., the key 522 and cached value 535) listed in the updated operation (e.g., "Update: Key 2b to 2X"), may need to be removed from the coupled key-value pair. The incompatible operation may first remove the value (e.g., the cached value 535) from the coupled value (e.g., the coupled value 530). The coupled value is deleted because the values (e.g., the cached values 533, 534, and 535 in FIG. 5B or the cached values 534 and 535 in FIG. 5C) within the coupled value (e.g., the coupled value 530) may no longer be related.

The values in a coupled value may be related due to a common set of fields. For example, as shown in FIG. 4B, values 481 ("Employee Object") and 482 ("User Object) are related as they share common fields, "First Name," and "Last Name." Another value related to only one of the values residing in the coupled value may maintain a relationship with other values through one value. For example, value 555 may maintain a relationship with value 540 through its relationship with value 550. Value 555 may include a portion of the value 550's content and thus may have common fields indicating such a relationship. When value 550 can no longer be part of coupled value 530, as shown in FIG. 5C, post delete value 522, the coupled cache 150 includes a new set of coupled cache key-value pairs.

The coupled value is deleted first instead of the keys to avoid orphaned coupled values. The deletion of coupled value may also involve storing each of the other values in the set of coupled values which are not requested to be deleted by the operation received in step 710 in a temporary section of memory.

In step 776, the coupled cache 150 may delete the coupled key. Deletion of a coupled key (e.g., the coupled key 520) may involve delisting of all the keys which are part of the coupled key. The delisting process may involve storing the keys associated with values not being deleted in a temporary location. The delisting process may also involve removing a link to a key and/or value from a couple key-value pair. In an incompatible delete operation, the delisting process may also involve deleting the key completely from the coupled cache 150.

In step 777, coupled cache 150 may remap each of the delisted keys (e.g., the key 521 and 522 in FIG. 5C) as a separate coupled key and map them to their original values (e.g., the cached values 534, and 535 in FIG. 5C). In an incompatible update operation, some of the key-value pairs (e.g., the keys 521, 523 and the cached values 534, 533 in FIG. 5B) may continue to be present as a coupled key-value pair (e.g., the coupled key 570 and the coupled value 580 in FIG. 5B). In the future, these newly created individual key-value pairs (e.g., the key 524 and the cached value 535 in FIG. 5B, the keys 521, 522 and cached values 534, 535 in FIG. 5C) may be coupled together to form a coupled key and coupled value, or may be coupled with other key-value pairs with which they were not part of.

In step 780, the software managing the coupled cache 150 saves the changes to the coupled cache. Saving changes to the coupled cache may involve deleting or updating the values in a database (e.g., the data source 120). Additionally, backup or archived versions may be stored as well.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces with any of a hardwired, wireless, optical, or similar, medium to communicate with another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, Python, Java, C, C++, assembly language, or any such programming languages, as well as data encoding languages (such as XML, JSON, etc.), query languages (such as SQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory computer readable medium including instructions that, when executed by at least one processor, cause the at least one processor to perform operations for updating a unified cache memory, the operations comprising:

receiving a request to perform an update operation on the unified cache memory;

determining whether the update operation is a compatible operation;

accessing the unified cache memory with a plurality of coupled lookup elements, the plurality of coupled lookup elements including at least one of:

coupled keys, comprising two or more coupled keys for identifying data in the unified cache memory; or coupled data, comprising two or more coupled data elements in the unified cache memory; and performing the update operation on at least one of the plurality of coupled lookup elements in the unified cache memory.

2. The non-transitory computer readable medium of claim 1, wherein the compatible operation comprises an operation that preserves a relationship between the coupled lookup elements.

3. The non-transitory computer readable medium of claim 1, wherein the compatible operation comprises adding a new coupled key pointing to one of the two or more coupled data elements.

4. The non-transitory computer readable medium of claim 1, wherein the compatible operation comprises adding a new data element to one of the two or more coupled keys.

5. The non-transitory computer readable medium of claim 1, wherein the compatible operation comprises updating a value of one of the two or more coupled data elements.

6. The non-transitory computer readable medium of claim 5, wherein the request to perform the update operation comprises providing a key to access the one of the two or more coupled data elements and to update the value of the one of the two or more coupled data elements.

7. The non-transitory computer readable medium of claim 6, wherein updating the value of the one of the two or more coupled data elements comprises:

updating the value in a physical storage location associated with the unified cache memory; and updating the value in the unified cache memory.

8. The non-transitory computer readable medium of claim 1, wherein the update operation comprises a request to update a value of one of the two or more coupled keys.

9. The non-transitory computer readable medium of claim 1, wherein performing the update operation comprises updating a relationship between a data element and a key of a coupled lookup element.

10. The non-transitory computer readable medium of claim 1, wherein the two or more coupled keys map to a single element of the two or more coupled data elements in the coupled data.

11. A computer-implemented method for updating a unified cache memory, the method comprising:

receiving a request to perform an update operation on the unified cache memory;

determining whether the update operation is a compatible operation;

accessing the unified cache memory with a plurality of coupled lookup elements, the plurality of coupled lookup elements including at least one of:

coupled keys, comprising two or more coupled keys for identifying data in the unified cache memory; or coupled data, comprising two or more coupled data elements in the unified cache memory; and performing the update operation on at least one of the plurality of coupled lookup elements in the unified cache memory.

12. The computer-implemented method of claim 11, wherein the coupled keys each represent one of a plurality of views of the coupled data elements.

13. The computer-implemented method of claim 11, wherein accessing the unified cache memory comprises obtaining one or more data sets to be retrieved during execution of an application.

14. The computer-implemented method of claim 11, wherein accessing the unified cache memory includes retrieving data from at least one of a disk storage or a network storage.

15. The computer-implemented method of claim 11, wherein the compatible operation comprises updating a coupled key to one or more coupled keys.

16. The computer-implemented method of claim 11, wherein the compatible operation comprises updating the coupled data to one or more coupled data elements.

17. The computer-implemented method of claim 11, wherein the update operation comprises a request to update one of the two or more coupled data elements.

18. The computer-implemented method of claim 11, wherein two applications access different keys of the two or more coupled keys to access a single element of the two or more coupled data elements in the coupled data.

19. The computer-implemented method of claim 11, wherein the update operation includes deleting a value from one of the two or more coupled data elements in the unified cache memory.

20. The computer-implemented method of claim 19, wherein deleting the value comprises delisting the value from the coupled data in the unified cache memory.

* * * * *